(12) United States Patent
Irvin et al.

(10) Patent No.: US 6,695,980 B2
(45) Date of Patent: *Feb. 24, 2004

(54) COMPRESSED FLUID FORMULATION CONTAINING ELECTROLUMINESCENT MATERIAL

(75) Inventors: Glen C. Irvin, Rochester, NY (US); Sridhar Sadasivan, Rochester, NY (US); Ramesh Jagannathan, Rochester, NY (US); Seshadri Jagannathan, Pittsford, NY (US); Suresh Sunderrajan, Rochester, NY (US); Rajesh V. Mehta, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 10/033,422

(22) Filed: Dec. 27, 2001

(65) Prior Publication Data

US 2003/0122106 A1 Jul. 3, 2003

(51) Int. Cl.⁷ .................................................. C09D 5/22
(52) U.S. Cl. .................... 252/301.16; 252/301.4 R; 252/301.4 S; 252/301.4 F; 252/301.4 P; 252/301.4 H; 252/301.5; 252/301.6 R; 252/301.6 P; 252/301.6 S; 252/301.6 F; 106/31.15; 106/31.32; 106/31.64; 106/31.92
(58) Field of Search .................... 428/670; 106/31.15, 106/31.32, 31.64, 31.92; 427/157, 66; 313/498, 504, 503; 252/301.16, 301.17, 301.18, 301.19, 301.21, 301.22, 301.23, 301.24, 301.25, 301.26, 301.27, 301.28, 301.29, 301.31, 301.32, 301.33, 301.4 R, 301.4 F, 301.4 P, 301.4 S, 301.4 H, 301.5, 301.6 R, 301.6 S, 301.6 P

(56) References Cited

U.S. PATENT DOCUMENTS

| | | | |
|---|---|---|---|
| 4,734,227 A | | 3/1988 | Smith |
| 6,116,718 A | | 9/2000 | Peeters et al. |
| 6,245,393 B1 | | 6/2001 | Thompson et al. |
| 6,471,327 B2 | * | 10/2002 | Jagannathan et al. ......... 347/21 |
| 2002/0187272 A1 | * | 12/2002 | Kojima et al. ............... 427/421 |
| 2003/0030706 A1 | * | 2/2003 | Jagannathan et al. ......... 347/85 |

FOREIGN PATENT DOCUMENTS

WO          WO 01/38003         *   5/2001

OTHER PUBLICATIONS

Irvin et al., "A Compressed Fluid Formulation", USSN 10/033,458 (Attorney Docket No. 83672D–W), filed Dec. 27, 2001.

* cited by examiner

Primary Examiner—C. Melissa Koslow
(74) Attorney, Agent, or Firm—Doreen M. Wells

(57) ABSTRACT

An imaging composition comprises a mixture of a fluid and a functional material; wherein the fluid is compressed and the functional material is an electroluminescent material which is dissolved, dispersed and/or solubilized in the compressed fluid; and wherein the mixture is thermodynamically stable or thermodynamically metastable or both.

22 Claims, No Drawings

US 6,695,980 B2

COMPRESSED FLUID FORMULATION CONTAINING ELECTROLUMINESCENT MATERIAL

CROSS-REFERENCE TO RELATED APPLICATIONS

This application relates to commonly assigned copending application Ser. No. 10/033,458, entitled A COMPRESSED FLUID FORMULATION, filed simultaneously herewith. The copending application is incorporated by reference herein for all that it contains.

FIELD OF THE INVENTION

This invention relates generally to imaging compositions that contain functional materials, more specifically, electroluminescent materials, more specifically, electroluminescent materials that are dissolved, dispersed and/or solubilized in a fluid that is in a compressed state. The compositions are used to create a high-resolution pattern or image onto a substrate for display applications.

BACKGROUND OF THE INVENTION

Ink jet recording or printing systems are commonly used to create high-resolution patterns on a substrate. In a typical ink jet recording or printing system, ink droplets are ejected from a nozzle towards a recording element or medium to produce an image on the medium. The ink droplets, or recording liquid, generally comprise a functional material or functional material, such as a dye or pigment or polymer, and a large amount of solvent. In conventional ink jet printing systems, the liquid ink droplets are ejected from the nozzle using pressure pulses generated by an oscillating piezoelectric crystal or by heating the nozzle to generate an ink droplet resulting from bubble formation or from ink phase change. The solvent, or carrier liquid, typically is made up of water, an organic material such as a monohydric alcohol, a polyhydric alcohol or mixtures thereof. There can be many additives in the system aimed at preserving the pixel integrity upon deposition to the receiver. Such materials may be surfactants, humectants, biocides, rheology modifiers, sequestrants, pH adjusters, and penetrants among others. Such materials are necessary due to the high solvent loads in conventional ink formulations. More recently, the ink jet printing method has been used to make electroluminescent display devices.

U.S. Pat. No. 6,245,393 discloses a method of making a muticolor display device, comprising a transparent substrate, fluorescent dye deposited in a dye layer on to a substrate by ink jet printing. There is a problem with this invention in that the ink jet printing compositions, which contain fluorescent dyes have high solvent loads to be used in conventional ink jet printers.

There are alternate technologies that are available in prior art, that eliminate this problem by using gaseous propellants. For example, Peeters et al., in U.S. Pat. No. 6,116,718, disclose a print head for use in a marking apparatus in which a propellant gas is passed through a channel, the functional material is introduced controllably into the propellant stream to form a ballistic aerosol for propelling non-colloidal, solid or semi-solid particulate or a liquid, toward a receiver with sufficient kinetic energy to fuse the marking material to the receiver. There is a problem with this technology in that the functional material and propellant stream are two different entities and the propellant is used to impart kinetic energy to the functional material. This can cause functional material agglomeration leading to nozzle obstruction and poor control over functional material deposition. Another problem with this technology is that when the functional material is added into the propellant stream in the channel it forms a non-colloidal ballistic aerosol prior to exiting the print head. This non-colloidal ballistic aerosol, which is a combination of the functional material and the propellant, is not thermodynamically stable. As such, the functional material is prone to settling in the propellant stream, which in turn, can cause functional material agglomeration leading to nozzle obstruction and poor control over functional material deposition.

Technologies that use supercritical fluid solvents to create thin films are also known. For example, R. D. Smith in U.S. Pat. No. 4,734,227, issued Mar. 29, 1988, discloses a method of depositing solid films or creating fine powders through the dissolution of a solid material into a supercritical fluid solution and then rapidly expanding the solution to create particles of the functional material in the form of fine powders or long thin fibers which may be used to make films. There is a problem with this method in that the free-jet expansion of the supercritical fluid solution results in a non-collimated/defocused spray that cannot be used to create high-resolution patterns on a receiver. Further, defocusing leads to losses of the functional material.

A different approach for creating high resolution patterns is needed—one that would eliminate the issues with solvent management. There is also a need for a technology that permits high speed, accurate, and precise deposition of a functional material, more specifically, electroluminescent material on a substrate to create display devices. There is also a need for a technology that permits high speed, accurate, and precise patterning of a substrate that can be used to create high-resolution patterns on a receiver to form electroluminescent displays.

SUMMARY OF THE INVENTION

The present invention overcomes the problems discussed above by providing an imaging composition comprising a mixture of a fluid and a functional material, more specifically electroluminescent material. The fluid is compressed and the functional material is dissolved, dispersed and/or solubilized in the compressed fluid. The mixture is thermodynamically stable or thermodynamically metastable or both. The invention is useful for making organic light emitting diode and polymeric light emitting diode display applications.

DETAILED DESCRIPTION OF THE INVENTION

The formulations useful in the present invention contain a functional material, more specifically, electroluminescent material, which is dissolved, dispersed and/or solubilized, in a compressed fluid. The compressed fluid is any material with a density greater than 0.1 grams/cc. The compressed fluid may include a compressed liquid and/or a supercritical fluid. Materials that are at sufficiently high temperatures and pressures below their critical point are known as compressed liquids. Materials in their supercritical fluid and/or compressed liquid state that exist as gases at ambient conditions find application here because of their unique ability to dissolve, solubilize and/or disperse functional materials, more specifically, electroluminescent materials, of interest in the compressed liquid or supercritical state. In this context, the chosen materials taken to a compressed liquid and/or supercritical fluid state are gases at ambient pressure and temperature. Ambient conditions are preferably defined as temperature in the range from −100 to +100° C., and pressure in the range from 1×10⁻⁸–100 atm for this application. More commonly, the ambient conditions are temperature in the range of 0 to 100° C. and pressure in the range from 1×10⁻⁵ to 100 atm. for this application. One skilled in the art should know how to select and maintain the appropriate ambient conditions such that the selected compressed fluid is gas at the ambient conditions.

The compressed fluids include, but are not limited to, carbon dioxide, nitrous oxide, ammonia, xenon, ethane, ethylene, propane, propylene, butane, isobutane, chlorotrifluoromethane, monofluoromethane, sulphur hexafluoride and mixtures thereof. Due its characteristics, e.g. low cost, wide availability, etc., carbon dioxide is generally preferred in many applications.

Functional materials, more specifically, electroluminescent materials can be any material that needs to be delivered to a receiver, to create a pattern on the receiver by deposition, or etching or other processes involving the placement of a functional material on a receiver for creating an electroluminescent device.

The functional materials, more specifically, electroluminescent materials may be selected from species that are ionic and/or molecular of the types such as organic, inorganic, metallo-organic, polymeric, oligomeric, metallic, alloy, ceramic, a synthetic and/or natural polymer, and a composite material of these previously mentioned. The functional material, more specifically, electroluminescent material can be a solid or a liquid or a combination of a liquid and a solid. Additionally, the functional material, more specifically electroluminescent materials can be an organic molecule, a polymer molecule, a metallo-organic molecule, an inorganic molecule, an organic nanoparticle, a polymer nanoparticle, a metallo-organic nanoparticle, an inorganic nanoparticle, an organic microparticles, a polymer micro-particle, a metallo-organic microparticle, an inorganic microparticle, and/or composites of these materials, etc. After suitable mixing with the compressed fluid the functional material, more specifically electroluminescent material, is uniformly distributed within a thermodynamically stable/metastable mixture, that can be a dispersion or a solution, with the compressed fluid.

Additionally, the formulation may contain a dispersant and or a surfactant to solubilize and/or disperse the functional material more specifically, an electroluminescent material. The dispersant and/or surfactant can be selected from any group that will have appropriate solubility in the compressed liquid and/or supercritical fluid medium as well as have interactions with the functional material so that the functional material can be solubilized. Such materials include, but are not limited to, fluorinated polymers such as perfluoropolyether, siloxane compounds, etc. The surfactants preferred in the invention include Fluorolink 7004® (Ausimont Montedison Group) (Formula I) and Fomblin MF-300 ® (Ausimont Montedison Group) (Formula II).

Additionally, the functional material, more specifically electroluminescent materials can be functionalized to dissolve, disperse and/or solubilize the functional material in the compressed fluid. The functionalization may be performed by attaching fluorocarbons, siloxane, hydrocarbon functional groups to the electroluminescent material.

Additionally, the ratio of surfactant to functional material in the formulation is from about 0.1:1 to about 500:1. More preferably, the ratio of surfactant to functional material is from about 1:1 to about 100:1. In yet another preferred embodiment of the invention, the ratio of co-solvent to functional material in the formulation is from about 0.01:1 to about 100:1. In still another embodiment of the invention, the ratio of compressed fluid to functional material in the formulation is from about 1×10⁵ to about 1:20.

The compressed fluid forms a continuous phase and the functional material dissolved, dispersed and/or solubilized in the compressed fluid forms a single phase. The formulation is maintained at a temperature and a pressure suitable for the functional material and the compressed fluid used in a particular application. More commonly, the formulation conditions are temperature in the range of 0 to 100° C. and pressure in the range from 1×10⁻² to 400 atm. for this application.

The method of preparing the formulation will now be discussed. The apparatus used for making the formulation has been disclosed in the pending U.S. application Ser. No. 09/794,671, now U.S. Pat. No. 6,471,327, which is incorporated here in its entirety. Briefly, the functional material is controllably introduced into the formulation reservoir. The compressed fluid is also controllably introduced into the formulation reservoir. The contents of the formulation reservoir are suitably mixed using mixing device to ensure intimate contact between the functional material and compressed fluid. As the mixing process proceeds, functional material is solubilized or dispersed within the compressed fluid. The process of dissolution/dispersion, including the amount of functional material and the rate at which the mixing proceeds, depends upon the functional material itself, the particle size and particle size distribution of the functional material (if the functional material is a solid), the compressed fluid used, the temperature, and the pressure within the formulation reservoir. When the mixing process is complete, the mixture or formulation of functional material and compressed fluid is thermodynamically stable/metastable in that the functional material is dissolved or dispersed within the compressed fluid in such a fashion as to be indefinitely contained in the same state as long as the temperature and pressure within the formulation chamber are maintained constant. This state is distinguished from other physical mixtures in that there is no settling, precipitation, and/or agglomeration of functional material particles within the formulation chamber unless the thermodynamic conditions of temperature and pressure within the reservoir are changed. As such, the functional material and compressed fluid mixtures or formulations of the present invention are said to be thermodynamically stable/metastable.

The method for delivering the formulation to a suitable receiver will now be discussed. The apparatus used for delivering the formulation to a suitable receiver has been disclosed in the pending U.S. application Ser. No. 09/794,671, which is incorporated here in its entirety. Briefly, the functional material is precipitated from the compressed fluid by manipulating and or changing the temperature and/or pressure conditions. The precipitated functional material is directed towards the receiver as a suitable shaped stream. The compressed fluid containing the functional material will be expanded through a suitable orifice into an ambient atmosphere where the compressed fluid will become a gas. The functional material will begin to precipitate non-reactively into particles and/or agglomerates of particles with the dispersant and/or surfactant coating the surfaces of these particles and/or agglomerates thereby limiting the growth of particles. The precipitated and/or aggregated functional material, free of compressed fluid, is deposited on a receiver in a precise and accurate fashion to form a desired image. Hence the receiver is instantaneously dry upon delivery of the functional material on the receiver.

The receiver can be any solid including an organic, an inorganic, a metallo-organic, a metallic, an alloy, a ceramic, a synthetic and/or natural polymeric, a gel, a glass, and a composite material. The receiver can be porous or non-porous.

The size of the precipitated nanomaterials can be controlled by the ratio of functional material to dispersant and/or surfactant. The size of the precipitated nanomaterials can be controlled by the depressurization step through suitable orifice design and optimization with temperature of solution, pressure of solution, flow rate of solution, and concentrations of the functional materials, more specifically, electroluminescent materials, more specifically, electroluminescent materials and dispersant and/or surfactants. The size of the precipitated nanomaterials can be controlled by the appropriate selection of dispersant and/or surfactant material such as the type of functional groups on the molecule as well as the solubility in the particular compressed liquid and/or supercritical fluid. Typical particle size of the functional material deposited on the receiver is in the range of 1 nanometer to 1000 nanometers. More preferably, the particle size of the functional material is in the range of 1 nanometer to 100 nanometers.

The precipitated nanomaterial can also be collected by any number of methods. For example, the precipitated nanomaterials may be injected into/onto a suitable substrate sheet for immobilization or the nanomaterials may be collected in a suitable liquid. Due to the surfactant coating of the nanomaterials during the depressurization process, the nanomaterials will be stable and not undergo significant agglomeration. Thereby, discrete nanoparticles can be obtained depending on the processing conditions.

It is to be understood that elements not specifically shown or described may take various forms well known to those skilled in the art. Additionally, materials identified as suitable for various facets of the invention, for example, functional materials, more specifically, electroluminescent materials, more specifically, electroluminescent materials, are to be treated as exemplary, and are not intended to limit the scope of the invention in any manner.

EXAMPLES

Example 1

Preparation of Formulation Containing C-545T, an Organic Light Emitting Diode Dopant Material 0.0058 g of C-545T (Formula III), 0.555 g of Fluorolink 7004 ® (Formula I) (Ausimont Montedison Group), and 5.0 g of $CO_2$ were placed in a high pressure cell at 25.3° C. and 150 atm. and mixed. After an appropriate time, the system was visibly homogeneous. The formulation was expanded to ambient condition through a needle valve for 5 seconds to deposit C-545T on a substrate.

Example 2

Preparation of Another Formulation Containing Copper Pthalocyanine, an Organic Light Emitting Diode Hole Injection Material 0.0126 g of Copper Phtalocyanine (Formula IV), 0.4763 g of Fluorolink ® 7004 (Formula I), and 7.06 g of $CO_2$ were placed in a high pressure cell at 25.3° C. and at 150 atm and mixed. After an appropriate time, the system was visibly homogeneous. The formulation was expanded to ambient condition through a needle valve for 5 seconds to deposit copper pthalocyanine on a substrate.

The invention has been described in detail with particular reference to certain preferred embodiments thereof, but it will be understood that variations and modifications can be effected within the spirit and scope of the invention.

Formula I: Chemical structure of surfactant Fluorolink 7004® used in the present invention

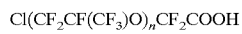

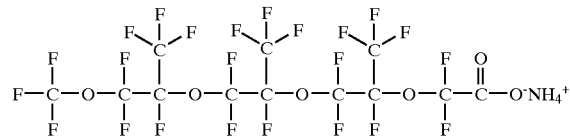

9b

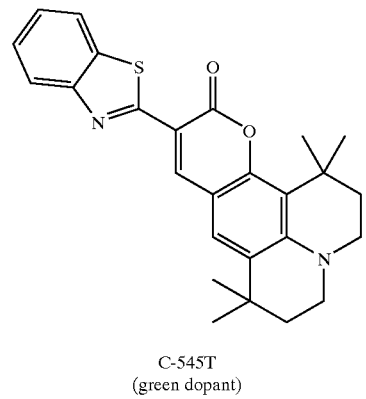

9c

C-545T
(green dopant)

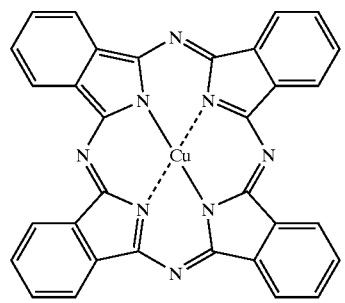

9d

What is claimed is:

1. An imaging composition comprising a mixture of a fluid, a functional material and a dispersant and/or surfactant to suspend the functional material;
   wherein the fluid is compressed and the functional material is an electroluminescent material which is dissolved, dispersed and/or solubilized in the compressed fluid; and
   wherein the mixture is thermodynamically stable or thermodynamically metastable or both.

2. The imaging composition according to claim 1, wherein the fluid is a compressed liquid.

3. The imaging composition according to claim 1, wherein the fluid is a supercritical fluid.

4. The imaging composition according to claim 1, wherein the fluid is a mixture of compressed liquid and supercritical fluid.

5. The imaging composition according to claim 1, wherein the fluid is selected from the group consisting of carbon dioxide, nitrous oxide, ammonia, xenon, ethane, ethylene, propane, propylene, butane, isobutane, chlorotrifluoromethane, monofluoromethane, and sulphur hexafluoride.

6. The imaging composition according to claim 1, wherein the fluid is carbon dioxide.

7. The imaging composition according to claim 1, wherein the functional material is a liquid, a solid or combinations thereof.

8. The imaging composition according to claim 1, wherein the functional material is selected from the group consisting of an organic molecule, a polymer molecule, a metallo-organic molecule, an inorganic molecule, an organic nanoparticle, a polymer nanoparticle, a metallo-organic nanoparticle, an inorganic nanoparticle, an organic microparticles, a polymer micro-particle, a metallo-organic microparticle, an inorganic microparticle, and a composite material.

9. The imaging composition according to claim 1, wherein the functional material is functionalized.

10. The imaging composition of claim 9, where in the functional groups for functionalization include fluorocarbons, siloxane or hydrocarbon groups.

11. The imaging composition according to claim 1, wherein the functional material is particulate.

12. The imaging composition according to claim 1, wherein the mean particle size of the functional material is between 1 nanometer and 1000 nanometers.

13. The imaging composition according to claim 12, wherein the mean particle size of the functional material is between 1 nanometer and 100 nanometers.

14. The imaging composition of claim 1, wherein on delivery to a substrate, the functional material is free of the compressed fluid.

15. The imaging composition of claim 1, further comprising a co-solvent.

16. The imaging composition of claim 15, wherein the surfactant is a perfluoropolyether, or siloxane surfactant.

17. The imaging composition of claim 15, wherein the ratio of surfactant to functional material is from about 0.1:1 to about 500:1.

18. The imaging composition of claim 17, wherein the ratio of surfactant to functional material is from about 1:1 to about 100:1.

19. The imaging composition of claim 15, wherein the ratio of co-solvent to functional material is from about 0.01:1 to about 100:1.

20. The imaging composition of claim 1, wherein the ratio of compressed fluid to functional material is from about $1:1\times10^5$ to about 1:20.

21. An imaging composition comprising a mixture of a fluid and a functional material, the fluid being compressed and the functional material being an electroluminescent material that is functionalized;
   wherein the functionalized functional material is dissolved in the compressed fluid and the mixture is thermodynamically stable or thermodynamically metastable or both.

22. The imaging composition according to claim 21, wherein the functional material is functionalized with groups that include fluorocarbons, hydrocarbons or siloxanes.

* * * * *